United States Patent [19]
Itoh

[11] Patent Number: 4,726,665
[45] Date of Patent: Feb. 23, 1988

[54] COMPACT WIDE-ANGLE ZOOM LENS
[75] Inventor: Takayuki Itoh, Tokyo, Japan
[73] Assignee: Asahi Kogaku Kogyo Kabushiki Kaisha, Tokyo, Japan
[21] Appl. No.: 853,243
[22] Filed: Apr. 17, 1986
[30] Foreign Application Priority Data Apr. 17, 1985 [JP] Japan .................. 60-83548

[51] Int. Cl.⁴ .............. G02B 15/16; G02B 9/64
[52] U.S. Cl. .................. 350/426; 350/423
[58] Field of Search ................. 350/426, 423
[56] References Cited

FOREIGN PATENT DOCUMENTS 0097016 6/1983 Japan ................. 350/423
0132207 8/1983 Japan ................. 350/423

Primary Examiner—John K. Corbin
Assistant Examiner—Rebecca D. Gass
Attorney, Agent, or Firm—Sughrue, Mion, Zinn, Macpeak and Seas

[57] ABSTRACT

A compact wide-angle zoom lens comprising, in order from the object side, a variator that consists of a first lens component having a negative focal length and a second lens component having a positive focal length, and a single-element fixed third lens component (relay lens system) that is positioned subsequent to the variator for increasing its focal length. The first lens component has a negative-positive lens unit arrangement. The second lens component has a positive-negative-positive lens unit arrangement. The first and second lens component are mechanically moved so as to provide a variable focal length and maintain a constant focal position. The following conditions are satisfied:

$$0.5 < \frac{f_2}{|f_1|} < 0.63; \quad (1)$$

$$0.75 < \frac{|f_1|}{f_L} < 1.05; \quad (2)$$

and $$1.0 < m_3 < 1.13 \quad (3)$$

where
$f_1$: the focal length of the first lens component;
$f_2$: the focal length of the second lens component;
$f_L$: the focal length of the overall system for the narrow-angle position; and
$m_3$: the lateral magnification of the third lens component.

8 Claims, 16 Drawing Figures

COMPACT WIDE-ANGLE ZOOM LENS

BACKGROUND OF THE INVENTION

The present invention relates to a zoom lens for use in a still camera. More particularly, the invention relates to a very compact zoom lens that has an f number of approximately 3.5 to 4.5 and which attains a zoom ratio of about two ranging from a half viewing angle of about 32° at the wide-angle and to about 17° at the semi-telephoto end.

Two general types of zoom lens are known that attain a zoom ratio of about two ranging from a wide angle to an angle at the semi-telephoto end: one type is generally referred to as the two-component type consisting of a negative first lens component and a positive second lens component and is disclosed in Unexamined Published Japanese Patent Application Nos. 64811/1984 and 142515/1984; and the other type which is shown in Unexamined Published Japanese Patent Application Nos. 97016/1983 and 111013/1983 is composed of a negative first lens component, a positive second lens component, and a negative third lens component which is fixed behind the second lens component (this latter type of zoom lens is hereunder referred to as the third-component fixed type).

Numerous zoom lenses of the two-component type are known, and the lens system shown in Unexamned Published Japanese Patent Application No. 64811/1984 is characterized by the shorter overall physical lens length that is realized by providing an aspherical surface within the first lens component and by suitably composing said component of two lens elements. However, since the first lens component has a small power and must be moved by a large amount during zooming, the overall lens length at the wide-angle end is by no means small. In addition, because of the great lens extension that is needed for focusing purposes, the closest focusing distance cannot be reduced satisfactorily. The system shown in Unexamined Published Japanese Patent Application No. 142515/1984 does not employ an aspherical surface and has a greater overall physical length than the system shown in Unexamined Published Japanese Patent Application No. 64811/1984. A further problem with the two-component type is that, compared with the third-component fixed type having the same overall lens length, the required movement of the second lens component having a stop diaphragm cannot be sufficiently reduced (as will be described hereinafter).

The zoom lens of the third-component fixed type is a rather recent concept but is essentially the same as the combination of the zoom lens of the two-component type with a rear converter. The system disclosed in Unexamined Published Japanese Patent Application No. 97016/1983 has the advantage of small distortion but, probably because of the fact that it is intended for use in a 6×4.5 cm or 6×7 cm camera, this lens system has a relatively large overall length and has to employ many lens elements, particularly in the first and third lens components. The system shown in Unexamined Published Japanese Patent Application No. 111013/1983 has the advantage of compactness but, because of the excessively great negative power of the first and third lens components, the system experiences great variations in spherical aberration and astigmatism during zooming. Additionally, the excessive power of the first lens component results in a need to move the second lens component to a comparatively large extent in spite of the presence of the third lens component.

Instead of being fixed, the negative third lens component may be designed to be movable toward the object side together with the second lens component as shown in many parents such as Unexamined Published Japanese Patent Application Nos. 26754/1979 and 59157/1979, but compared with the third-lens component fixed type, this movable type has a large overall length and requires a large movement of the second lens component having a stop diaphragm.

OBJECTS AND SUMMARY OF THE INVENTION

The primary object of the present invention is to provide a zoom lens of the third-component fixed type that has a minimum overall lens length using a smaller number of lens elements than the same type of zoom lens disclosed in Unexamined Published Japanese Patent Application No. 111013/1983 (the lens arrangement employed by the present invention is the same as the two-component type disclosed in Unexamined Published Japanese Patent Application Nos. 64811/1984 and 142414/1984) and which is capable of efficient aberration correction for providing high lens performance.

Another object of the present invention is to provide a small and lightweight system with a lens barrel by reducing not only the overall lens length but also the required amount of movement of the second lens component having a stop diaphragm.

DESCRIPTION OF THE PREFERRED EMBODIMENTS

The compact wide-angle zoom lens of the present invention is composed, in order from the object side, of a variator that consists of a first lens component having a negative focal length and a second lens component having a positive focal length, and a fixed third lens component (relay lens system) that is positioned subsequent to the variator for increasing its focal length, said first lens component having a negative-positive lens unit arrangement, said second lens component having a positive-negative-positive lens unit arrangement, and said first and second lens components being mechanically moved so as to provide a variable focal length and maintain a constant focal position, characterized in that the following conditions are satisfied:

$$0.5 < \frac{f_2}{|f_1|} < 0.63; \quad (1)$$

$$0.75 < \frac{|f_1|}{f_L} < 1.05; \quad (2)$$

and

-continued $$1.0 < m_3 < 1.13 \quad (3)$$

where
- $f_1$: the focal length of the first lens component;
- $f_2$: the focal length of the second lens component;
- $f_L$: the focal length of the overall system at the telephoto end position; and
- $m_3$: the lateral magnification of the third lens component.

In the wide-angle zoom lens having the aforementioned features, the first lens component is composed of three units each consisting of a single lens element and which are comprised, in order from the object side, of two negative meniscus lenses having a concave surface with a smaller radius of curvature on the image side, and one positive meniscus lens having a convex surface with a smaller radius of curvature on the object side, and the following condition is satisfied:

$$1.7 < \overline{N}n \quad (4)$$

where $\overline{N}n$: the average of refractive indices at d-line of the negative lenses in the first lens component.

Alternatively, the first lens component is composed of two units each consisting of a single lens element and which are comprised, in order from the object side, of one negative lens having a concave surface with a smaller radius of curvature on the image side, and one positive meniscus lens having a convex surface with a smaller radius of curvature on the object side, and said first lens component has at least one aspherical surface.

The second lens component in the zoom lens of the present invention is composed of four units each consisting of a single lens element and which are comprised, in order from the object side, of two positive lenses having a convex surface with a smaller radius of curvature on the object side, a negative lens having a concave surface with a smaller radius of curvature on the image side, and a positive lens having a convex surface with a smaller radius of curvature on the image side, and the following condition is satisfied:

$$1.65 < \overline{N}p \quad (5)$$

where $\overline{N}p$: the average of refractive indices at d-line of the positive lens units on the object side in the second component.

The third lens component is composed of only one negative lens element.

As far as the lens arrangement of the first and second lens components is concerned, the zoom lens of the present invention has no significant difference from the system of the two-component type disclosed in Unexamined Published Japanese Patent Application No. 142515/1984. However, the required amount of movement of the first lens component is reduced by increasing the power of each lens component as compared with the lens components employed in that prior art system; additionally, the required amount of movement of the second lens component is reduced by disposing a fixed third lens component with a negative refractive power behind the system of the two-component type.

The required amount of movement of the second lens component, $\Delta X_2$, is expressed by:

$$\Delta X_2 = \frac{f_2}{f_1} \cdot \frac{(f_L - f_S)}{m_3}$$

where $f_S$ is the focal length of the overall system at the wide-angle position.

If, in the system of the two-component type where $m_3 = 1$, the power of each lens component is increased, $f_1$ will decrease by a greater degree than $f_2$ and the required amount of the rear component has a tendency to increase rather than decrease. However, in the third-component fixed type employing a negative lens in the third lens component, $m_3$ is greater than 1 and the required amount of movement of the second lens component can be made smaller even if the power of each of the first and second lens components is increased as compared with the two-component type.

As is clear from the formula given above, the required amount of movement of the second lens component, $\Delta X_2$, can be made smaller by reducing the value of $f_2/|f_1|$ in condition (1). However, if $f_2/|f_1|$ becomes equal to or smaller than 0.5, the absolute value of $f_1$ is increased (the second lens component constitutes a master lens, so the value of $f_2$ will not vary substantially with the lens type). This is advantageous for the purpose of decreasing $\Delta X_2$ but, on the other hand, the value of $\Delta X_1$ (the required amount of movement of the first lens component) is increased, causing an increase in the overall lens length at the wide-angle position and in the diameter of the first lens element, which is contrary to the purpose of providing a compact zoom lens. If the value of $f_2/|f_1|$ exceeds 0.63, the absolute value of $f_1$ is decreased as in the case of Unexamined Published Japanese Patent Application No. 111013/1983, and the value of $\Delta X_2$ is increased despite the presence of the third lens component. Additionally, increased aberrational variations will occur during zooming.

The condition (2) dictates the power of the first lens component. While the condition (1) is satisfied by simply reducing the power of the first lens component, the condition (2) puts further limits on this parameter so that the required amount of movement of the first lens component and the diameter of the first lens element can be reduced. If $|f_1|/f_L$ is equal to or smaller than 0.75, the power of the first lens component is increased to such a value that the upper limit of the condition (1) is not satisfied, and increased aberrational variations will occur during zooming and focusing. If, on the other hand, $|f_1|/f_L$ exceeds 1.05, aberrations can be effectively corrected but a compact zoom lens cannot be obtained.

The condition (3) dictates the magnification of the third lens component. If $m_3$ is equal to or smaller than 1.0, the value of $\Delta X_2$ will become greater than in the case of the zoom lens of the two-component type. On the other hand, $m_3$ exceeding 1.13 is highly effective for the purpose of reducing $\Delta X_2$ but, at the same time, the single negative lens is insufficient to prevent the flare occurring in the first and second lens components from being increased by $m_3$. If the third lens component would be composed of two or more lens elements, it could have a magnification greater than 1.13 as shown in Unexamined Published Japanese Patent Application No. 97016/1983, but then the manufacturing cost is increased and the objects of the present invention cannot be attained.

The condition (4) concerns the negative lens units in the first lens component. The more compact the zoom lens is, the greater the tendency for Petzval's sum to become negative if $\overline{N}p$ is equal to or less than 1.7. A particular problem is that when a maximum view angle is attained at the short-focus position, the sagittal astigmatism becomes excessive and considerable difficulty will be involved in its compensation.

The condition (5) concerns the positive lens units in the second lens component that are positioned closer to the object. The more compact the zoom lens is, the greater the variations that will be introduced into spherical and coma aberrations during zooming if $\overline{N}p$ is equal to or less than 1.65.

Examples 1 to 4 of the zoom lens system of the present invention are described hereinafter, wherein f stands for the focal length, $\omega$ is the half viewing angle, $\gamma$ is the radius of curvature of each of the surfaces of a lens, d is the thickness of a lens or the aerial distance between lenses, N is the refractive index of a lens, $\nu$ is the Abbe number of a lens, and $f_B$ is the back-focus.

EXAMPLE 1

Figure 1:
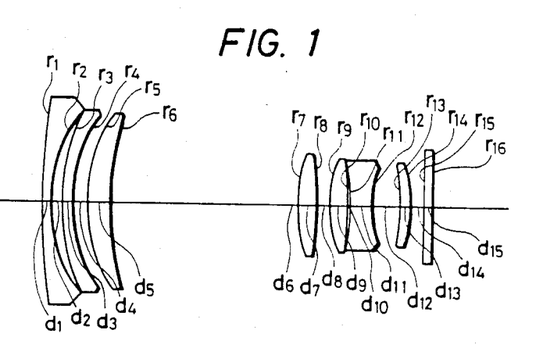
FIGS. 1, 3, 5 and 7 are simplified cross-sectional views of the zoom lens system for the wide-angle position in accordance with Examples 1, 2, 3 and 4 of the present invention.
Figure 2A:
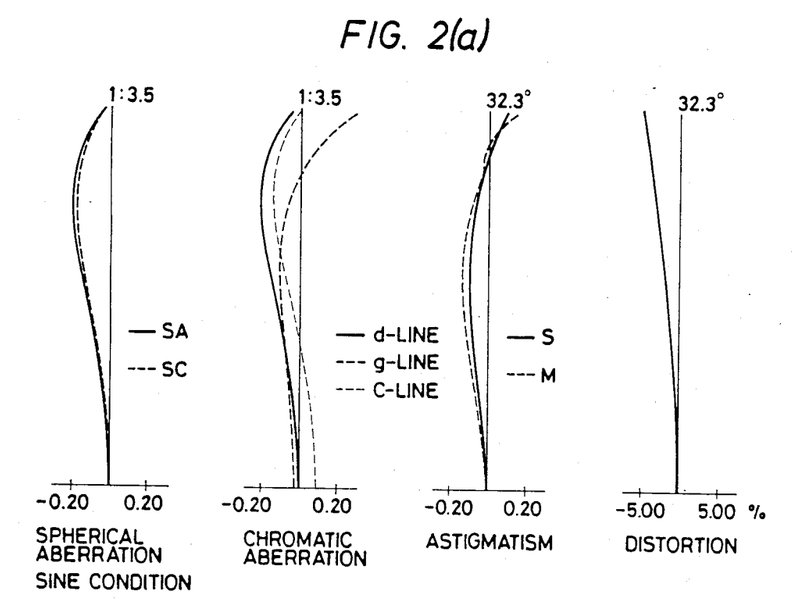
FIGS. 2, 4, 6 and 8 are aberration diagrams for the lens systems shown in FIGS. 1, 2, 3 and 4, respectively, wherein (a) is an aberration curve for the wide-angle position, (b) for the middle-angle position, and (c) for the narrow-angle position.
Figure 2B:
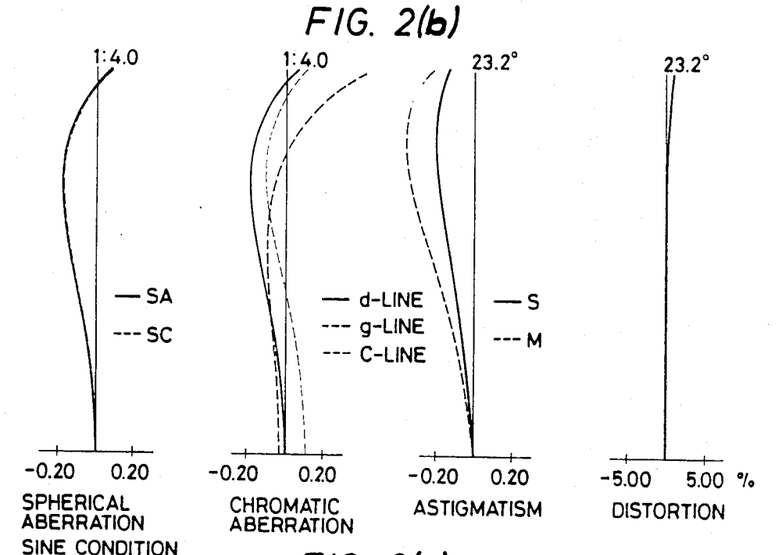
Figure 2C:
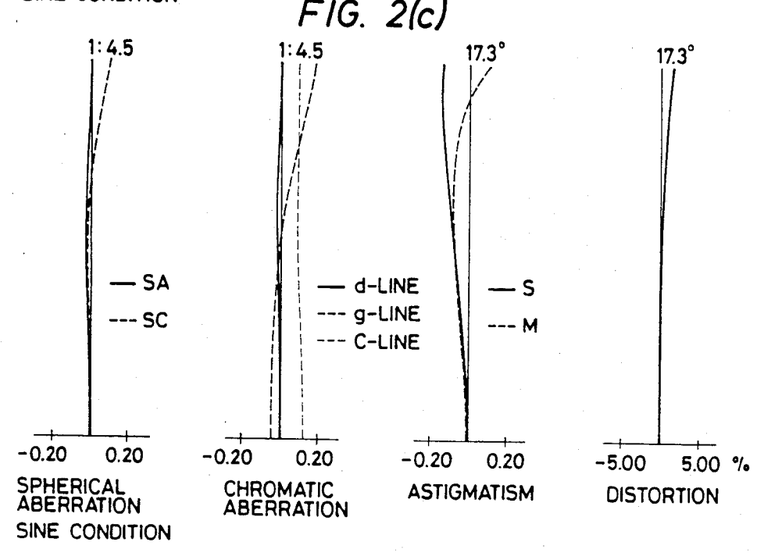

| Surface No. | r | d | N | $\nu$ |
|---|---|---|---|---|
| | 1: 3.5–4.5 | f = 36.0–68.0 | $\omega$ = 32.3°–17.3° | |
| 1 | 115.870 | 1.650 | 1.83400 | 37.2 |
| 2 | 26.538 | 2.202 | | |
| 3 | 39.330 | 1.530 | 1.77250 | 49.6 |
| 4 | 26.570 | 2.752 | | |
| 5 | 26.597 | 4.463 | 1.80518 | 25.4 |
| 6 | 56.948 | 35.042~1.50 | | |
| 7 | 30.766 | 3.035 | 1.71300 | 53.8 |
| 8 | −118.528 | 2.700 | | |
| 9 | 20.453 | 2.839 | 1.72000 | 43.7 |
| 10 | 181.433 | 0.534 | | |
| 11 | −92.385 | 4.194 | 1.80518 | 25.4 |
| 12 | 16.051 | 5.49 | | |
| 13 | −55.592 | 2.044 | 1.68893 | 31.1 |
| 14 | −23.455 | 2.28~19.266 | | |
| 15 | −500.003 | 1.50 | 1.51633 | 64.1 |
| 16 | 500.003 | | | |

$f_B = 37.80$ $\dfrac{f_2}{|f_1|} = 0.573 \quad \dfrac{|f_1|}{f_L} = 0.947 \quad m_3 = 1.08$ $\overline{N}n = 1.803 \quad \overline{N}p = 1.716$

EXAMPLE 2

Figure 3:
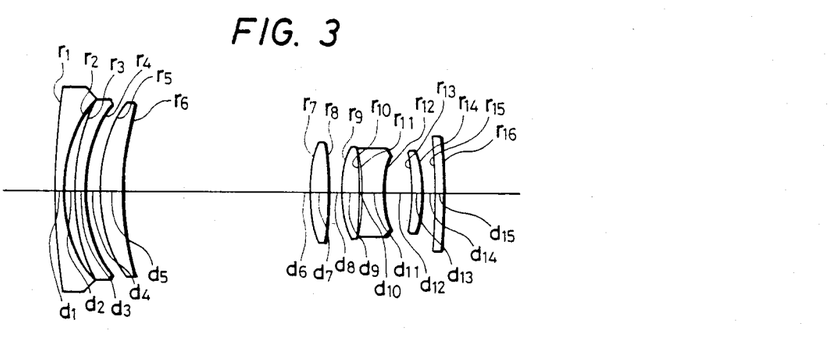
Figure 4A:
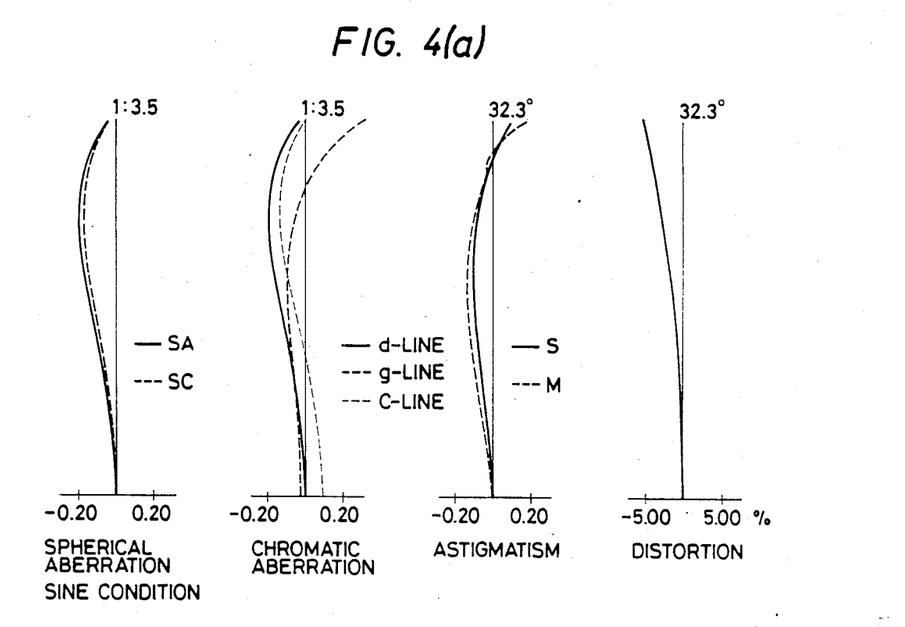
Figure 4B:
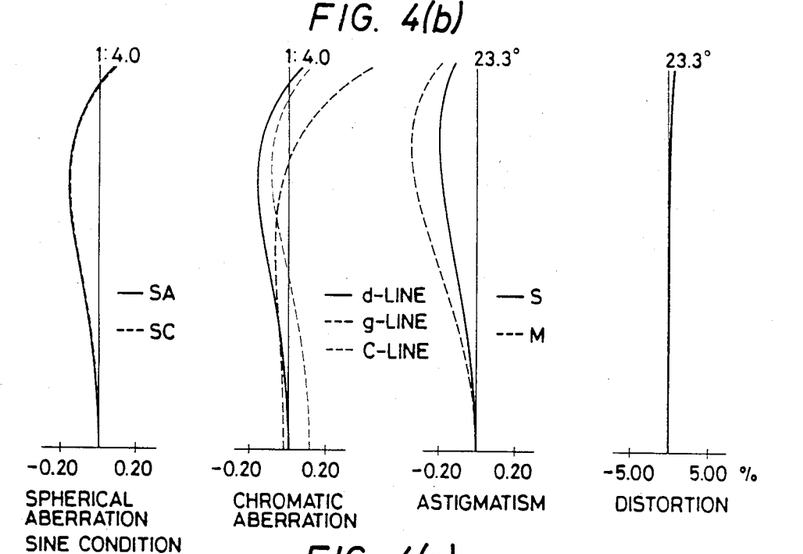
Figure 4C:
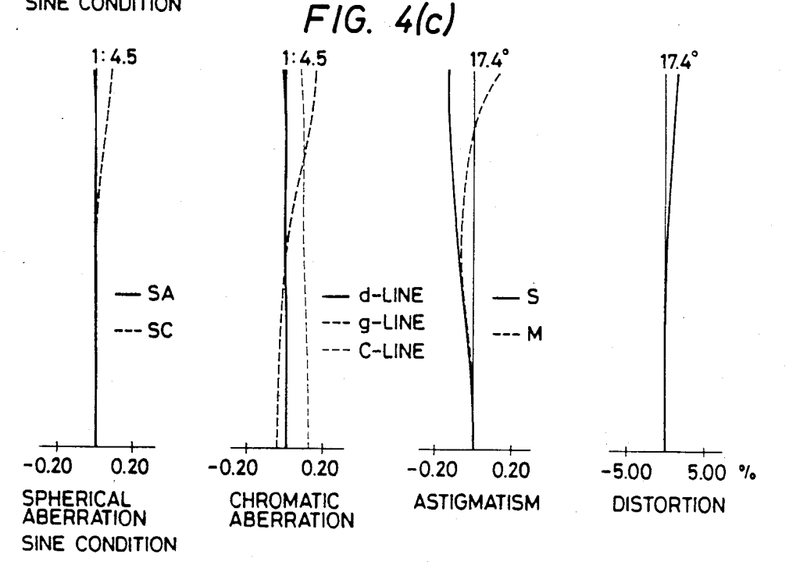

| Surface No. | r | d | N | $\nu$ |
|---|---|---|---|---|
| | 1: 3.5–4.5 | f = 36.0–68.0 | $\omega$ = 32.3°–17.4° | |
| 1 | 115.942 | 1.650 | 1.83400 | 37.2 |
| 2 | 26.340 | 2.261 | | |
| 3 | 39.481 | 1.530 | 1.77250 | 49.6 |
| 4 | 26.884 | 2.671 | | |
| 5 | 26.676 | 4.463 | 1.80518 | 25.4 |
| 6 | 57.470 | 35.015~1.50 | | |
| 7 | 30.281 | 3.053 | 1.71300 | 53.8 |
| 8 | −119.377 | 2.700 | | |
| 9 | 20.158 | 2.824 | 1.72000 | 43.7 |
| 10 | 151.434 | 0.540 | | |
| 11 | −99.509 | 4.058 | 1.80518 | 25.4 |
| 12 | 15.833 | 5.591 | | |
| 13 | −55.774 | 2.041 | 1.68893 | 31.1 |
| 14 | −23.736 | 2.272~19.317 | | |
| 15 | −100.000 | 1.50 | 1.58913 | 61.0 |
| 16 | −144.907 | | | |

$f_B = 37.80$

| Surface No. | r | d | N | $\nu$ |
|---|---|---|---|---|
| | 1: 3.5–4.5 | f = 36.0–68.0 | $\omega$ = 32.3°–17.4° | |

$\dfrac{f_2}{|f_1|} = 0.572 \quad \dfrac{|f_1|}{f_L} = 0.950 \quad m_3 = 1.074$ $\overline{N}n = 1.803 \quad \overline{N}p = 1.716$

EXAMPLE 3

Figure 5:
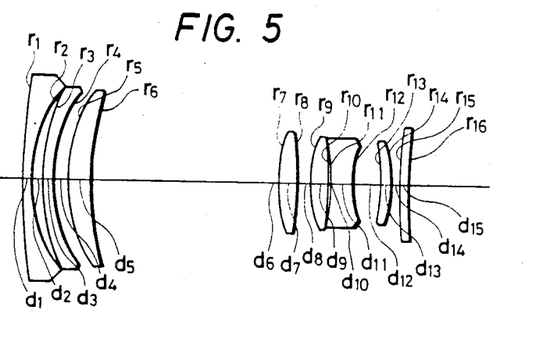
Figure 6A:
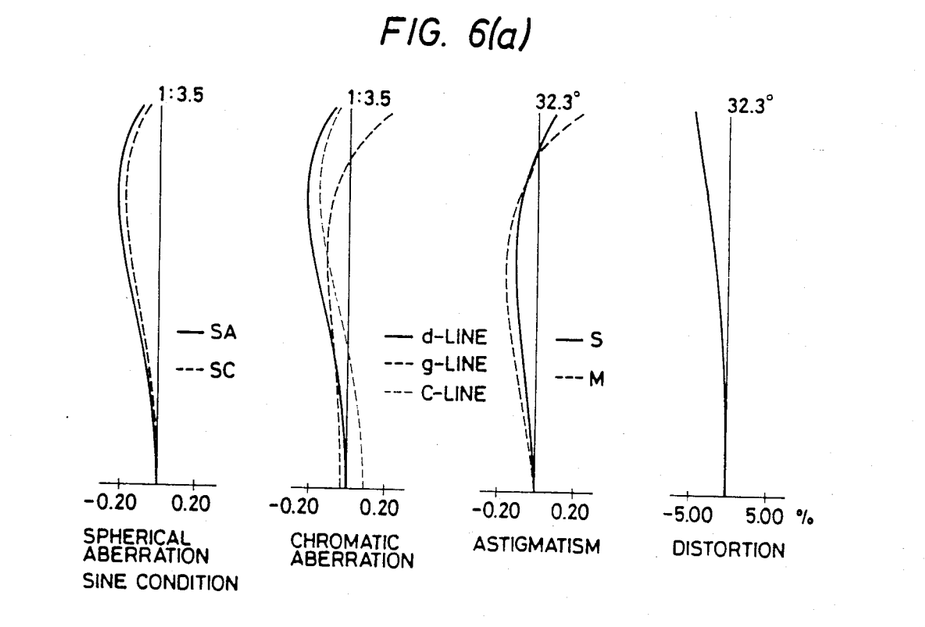
Figure 6B:
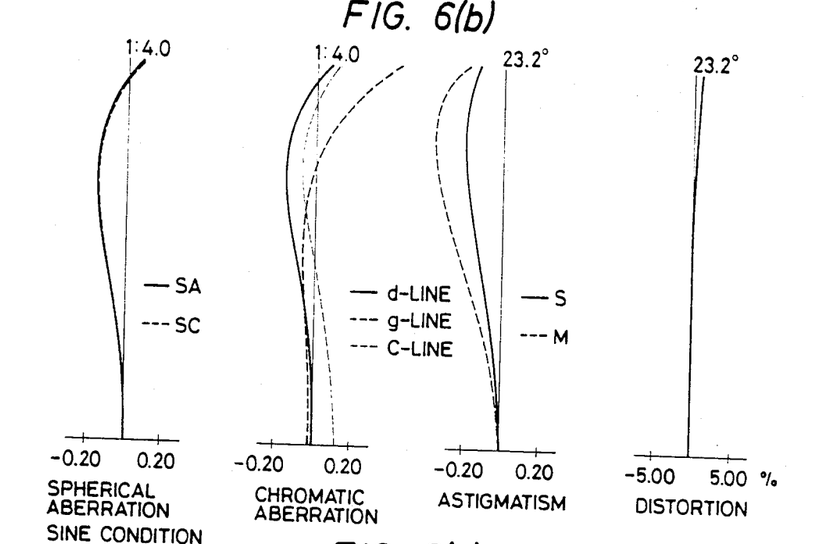
Figure 6C:
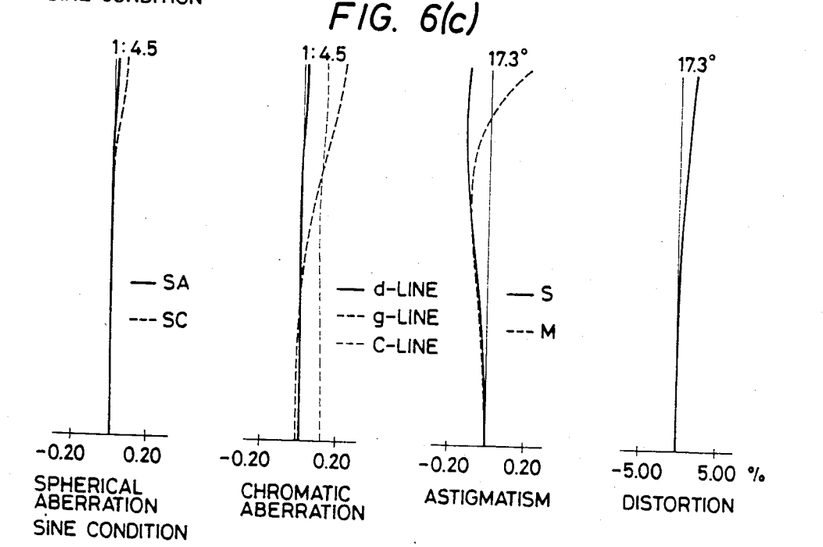

| Surface No. | r | d | N | $\nu$ |
|---|---|---|---|---|
| | 1: 3.5–4.5 | f = 36.0–68.0 | $\omega$ = 32.3°–17.3° | |
| 1 | 118.281 | 1.650 | 1.83400 | 37.2 |
| 2 | 26.270 | 2.194 | | |
| 3 | 38.570 | 1.530 | 1.71300 | 53.8 |
| 4 | 26.854 | 2.828 | | |
| 5 | 26.721 | 4.358 | 1.80518 | 25.4 |
| 6 | 54.812 | 35.016~1.50 | | |
| 7 | 30.936 | 3.025 | 1.71300 | 53.8 |
| 8 | −119.565 | 2.700 | | |
| 9 | 20.325 | 2.822 | 1.72000 | 43.7 |
| 10 | 154.724 | 0.533 | | |
| 11 | −101.896 | 4.157 | 1.80518 | 25.4 |
| 12 | 16.057 | 5.458 | | |
| 13 | −56.447 | 2.006 | 1.68893 | 31.1 |
| 14 | −24.281 | 1.556 | | |
| 15 | 74.503 | 1.500 | 1.51633 | 64.1 |
| 16 | 60.914 | | | |

$f_B = 38.212$ $\dfrac{f_2}{|f_1|} = 0.573 \quad \dfrac{|f_1|}{f_L} = 0.960 \quad m_3 = 1.05$ $\overline{N}n = 1.773 \quad \overline{N}p = 1.716$

EXAMPLE 4

Figure 7:
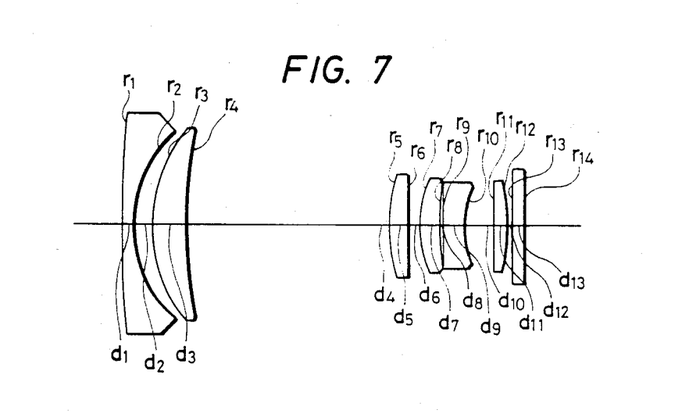
Figure 8A:
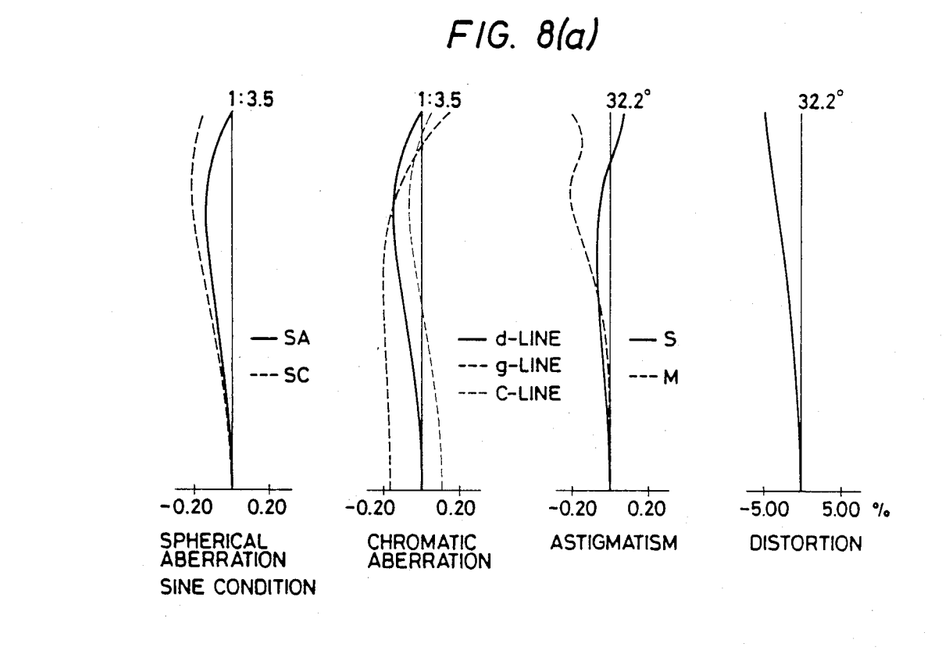
Figure 8B:
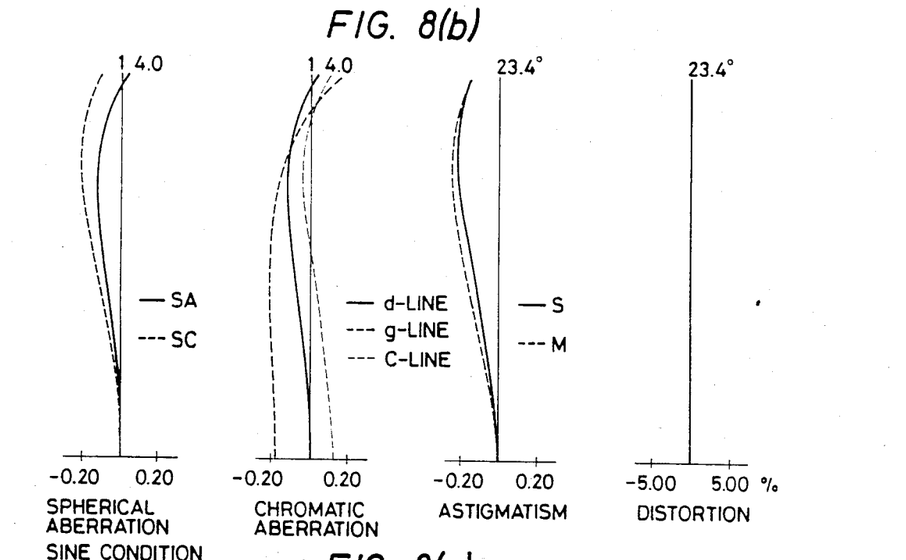
Figure 8C:
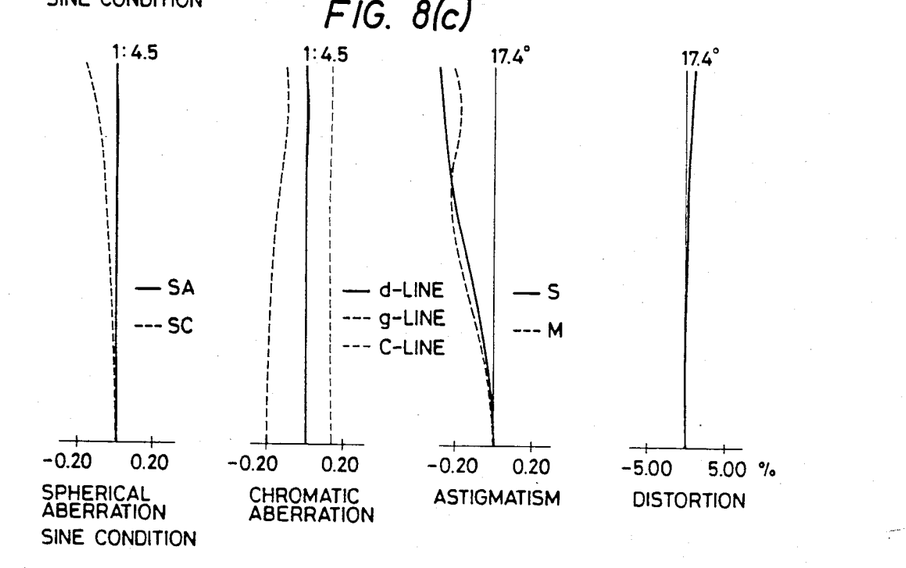

| Surface No. | r | d | N | $\nu$ |
|---|---|---|---|---|
| | 1:3.5–4.5 | f = 36.15–68.0 | $\omega$ = 32.2°–17.4° | |
| 1 | 274.724 | 1.800 | 1.83400 | 37.2 |
| 2 | 21.981 | 3.790 | | |
| 3 | 28.667 | 5.792 | 1.80518 | 25.4 |
| 4 | 80.387 | 37.795~1.10 | | |
| 5 | 29.105 | 3.494 | 1.73400 | 51.5 |
| 6 | −693.812 | 2.000 | | |
| 7 | 18.841 | 3.918 | 1.67003 | 47.3 |
| 8 | 72.423 | 0.702 | | |
| 9 | −428.538 | 3.473 | 1.80518 | 25.4 |
| 10 | 15.163 | 5.559 | | |
| 11 | 153.119 | 2.558 | 1.59270 | 35.3 |
| 12 | −36.480 | 1.00~16.815 | | |
| 13 | −1776.573 | 2.000 | 1.51633 | 64.1 |
| 14 | 236.157 | | | |

$f_B = 38.00$

Aspherical third surface $K = -0.34763$
$a_1 = 0.13675 \times 10^{-5}$
$a_2 = -0.13077 \times 10^{-8}$ where the aspherical surface function, X is given by:

$$X = \dfrac{Cy^2}{1 + \sqrt{1 - (1 + K)C^2 y^2}} + a_1 y^4 + a_2 y^6$$

$\dfrac{f_2}{|f_1|} = 0.543 \quad \dfrac{|f_1|}{f_L} = 1.015 \quad m_3 = 1.095$ $\overline{N}n = 1.834 \quad \overline{N}p = 1.702.$

I claim:

1. A compact wide-angle zoom lens having a plurality of lens components, at least some of which are movable between a wide-angle position and a narrow-angle position, said zoom lens being composed, in order from the object side, of a variator that consists of a first lens component having a negative focal length and a second lens component having a positive focal length, and a fixed third lens component that is positioned subsequent to the variator for increasing its focal length, said first lens component having a negative-positive lens unit arrangement, said second lens component having a positive-negative-positive lens unit arrangement, and said first and second lens components being mechanically moved so as to provide a variable focal length and maintain a constant focal position, said third lens component being composed of only one negative lens element, wherein the following conditions are satisfied:

$$0.5 < \frac{f_2}{|f_1|} < 0.63; \quad (1)$$

$$0.75 < \frac{|f_1|}{f_L} < 1.05; \quad (2)$$

and $$1.0 < m_3 < 1.13 \quad (3)$$

where
- $f_1$: the focal length of the first lens component;
- $f_2$: the focal length of the second lens component;
- $f_L$: the focal length of the overall system for the narrow-angle position; and
- $m_3$: the lateral magnification of the third lens component.

2. A compact wide-angle zoom lens according to claim 1 wherein the first lens component is composed of three units each consisting of a single lens element and which are comprised, in order from the object side, of two negative meniscus lenses having a concave surface with a smaller radius of curvature on the image side, and a positive meniscus lens having a convex surface with a smaller radius of curvature on the object side, and the following condition is satisfied:

$$1.7 < \overline{N}n \quad (4)$$

where $\overline{N}n$: the average of refractive indices at d-line of the negative lenses in the first lens component.

3. A compact wide-angle zoom lens according to claim 1 wherein the first lens component is composed of two units each consisting of a single lens element and which are comprised in order from the object side of one negative lens having a concave surface with a smaller radius of curvature on the image side, and one positive meniscus lens having a convex surface with a smaller radius of curvature on the object side, and said first lens component having at least one aspherical surface.

4. A compact wide-angle zoom lens according to any one of claims 1 to 3 wherein the second lens component is composed of four units each consisting of a single lens element and which are comprised, in order from the object side, of two positive lenses having a convex surface with a smaller radius of curvature on the object side, a negative lens having a concave surface with a smaller radius of curvature on the image side, and a positive lens having a convex surface with a smaller radius of curvature on the image side, and the following condition is satisfied:

$$1.65 < \overline{N}p \quad (5)$$

where $\overline{N}p$: the average of refractive indice at d-line of the positive lens units on the object side in the second lens component.

5. A compact wide-angle zoom lens according to claim 1, further satisfying the following chart:

| Surface No. | 1: 3.5–4.5  $f = 36.0–68.0$  $\omega = 32.3°–17.3°$ | | | |
|---|---|---|---|---|
| | r | d | N | $\nu$ |
| 1 | 115.870 | 1.650 | 1.83400 | 37.2 |
| 2 | 26.538 | 2.202 | | |
| 3 | 39.330 | 1.530 | 1.77250 | 49.6 |
| 4 | 26.570 | 2.752 | | |
| 5 | 26.597 | 4.463 | 1.80518 | 25.4 |
| 6 | 56.948 | 35.042~1.50 | | |
| 7 | 30.766 | 3.035 | 1.71300 | 53.8 |
| 8 | −118.528 | 2.700 | | |
| 9 | 20.453 | 2.839 | 1.72000 | 43.7 |
| 10 | 181.433 | 0.534 | | |
| 11 | −92.385 | 4.194 | 1.80518 | 25.4 |
| 12 | 16.051 | 5.49 | | |
| 13 | −55.592 | 2.044 | 1.68893 | 31.1 |
| 14 | −23.455 | 2.28~19.266 | | |
| 15 | −500.003 | 1.50 | 1.51633 | 64.1 |
| 16 | 500.003 | | | |

$f_B = 37.80$ $\frac{f_2}{|f_1|} = 0.573 \quad \frac{|f_1|}{f_L} = 0.947 \quad m_3 = 1.08$ $\overline{N}n = 1.803 \quad \overline{N}p = 1.716$ where f stands for the focal length, $\omega$ is the half viewing angle, r is the radius of curvature of each of the surface of a lens, d is the thickness of a lens or the aerial distance between lenses, N is the refractive index of a lens, $\nu$ is the Abbe number of a lens, and $f_B$ is the back-focus.

6. A compact wide-angle zoom lens according to claim 1, further satisfying the following chart:

| Surface No. | 1: 3.5–4.5  $f = 36.0–68.0$  $\omega = 32.3°–17.4°$ | | | |
|---|---|---|---|---|
| | r | d | N | $\nu$ |
| 1 | 115.942 | 1.650 | 1.83400 | 37.2 |
| 2 | 26.340 | 2.261 | | |
| 3 | 39.481 | 1.530 | 1.77250 | 49.6 |
| 4 | 26.884 | 2.671 | | |
| 5 | 26.676 | 4.463 | 1.80518 | 25.4 |
| 6 | 57.470 | 35.015~1.50 | | |
| 7 | 30.281 | 3.053 | 1.71300 | 53.8 |
| 8 | −119.377 | 2.700 | | |
| 9 | 20.158 | 2.824 | 1.72000 | 43.7 |
| 10 | 151.434 | 0.540 | | |
| 11 | −99.509 | 4.058 | 1.80518 | 25.4 |
| 12 | 15.833 | 5.591 | | |
| 13 | −55.774 | 2.041 | 1.68893 | 31.1 |
| 14 | −23.736 | 2.272~19.317 | | |
| 15 | −100.000 | 1.50 | 1.58913 | 61.0 |
| 16 | −144.907 | | | |

$f_B = 37.80$ $\frac{f_2}{|f_1|} = 0.572 \quad \frac{|f_1|}{f_L} = 0.950 \quad m_3 = 1.074$ $\overline{N}n = 1.803 \quad \overline{N}p = 1.716.$ 7. A compact wide-angle zoom lens according to claim 1, further satisfying the following chart:

| 1: 3.5–4.5 | f = 36.0–68.0 | ω = 32.3°–17.3° | | |
|---|---|---|---|---|
| Surface No. | r | d | N | ν |
| 1 | 118.281 | 1.650 | 1.83400 | 37.2 |
| 2 | 26.270 | 2.194 | | |
| 3 | 38.570 | 1.530 | 1.71300 | 53.8 |
| 4 | 26.854 | 2.828 | | |
| 5 | 26.721 | 4.358 | 1.80518 | 25.4 |
| 6 | 54.812 | 35.016~1.50 | | |
| 7 | 30.936 | 3.025 | 1.71300 | 53.8 |
| 8 | −119.565 | 2.700 | | |
| 9 | 20.325 | 2.822 | 1.72000 | 43.7 |
| 10 | 154.724 | 0.533 | | |
| 11 | −101.896 | 4.157 | 1.80518 | 25.4 |
| 12 | 16.057 | 5.458 | | |
| 13 | −56.447 | 2.006 | 1.68893 | 31.1 |
| 14 | −24.281 | 1.556 | | |
| 15 | 74.503 | 1.500 | 1.51633 | 64.1 |
| 16 | 60.914 | | | |
| $f_B = 38.212$ | | | | |

$$\frac{f_2}{|f_1|} = 0.573 \quad \frac{|f_1|}{f_L} = 0.960 \quad m_3 = 1.05$$

$$\overline{N}_n = 1.773 \quad \overline{N}_p = 1.716.$$

8. A compact wide-angle zoom lens according to claim 1, further satisfying the following chart:

| 1:3.5–4.5 | f = 36.15–68.0 | ω = 32.2°–17.4° | | |
|---|---|---|---|---|
| Surface No. | r | d | N | ν |
| 1 | 274.724 | 1.800 | 1.83400 | 37.2 |
| 2 | 21.981 | 3.790 | | |
| 3 | 28.667 | 5.792 | 1.80518 | 25.4 |
| 4 | 80.387 | 37.795~1.10 | | |
| 5 | 29.105 | 3.494 | 1.73400 | 51.5 |
| 6 | −693.812 | 2.000 | | |
| 7 | 18.841 | 3.918 | 1.67003 | 47.3 |
| 8 | 72.423 | 0.702 | | |
| 9 | −428.538 | 3.473 | 1.80518 | 25.4 |
| 10 | 15.163 | 5.559 | | |
| 11 | 153.119 | 2.558 | 1.59270 | 35.3 |
| 12 | −36.480 | 1.00~16.815 | | |
| 13 | −1776.573 | 2.000 | 1.51633 | 64.1 |
| 14 | 236.157 | | | |
| $f_B = 38.00$ | | | | |
| Aspherical | third surface | K = −0.34763 | | |
| | | $a_1 = 0.13675 \times 10^{-5}$ | | |
| | | $a_2 = -0.13077 \times 10^{-8}$ | | | where the aspherical surface function, X is given by:

$$X = \frac{Cy^2}{1 + \sqrt{1 - (1+K)C^2y^2}} + a_1y^4 + a_2y^6$$

$$\frac{f_2}{|f_1|} = 0.543 \quad \frac{|f_1|}{f_L} = 1.015 \quad m_3 = 1.095$$

$$\overline{N}_n = 1.834 \quad \overline{N}_p = 1.702.$$

* * * * *